United States Patent [19]

Grigo et al.

[11] 4,338,409

[45] Jul. 6, 1982

[54] ELASTOMERIC THERMOPLASTIC MOULDING COMPOSITIONS

[75] Inventors: Ulrich Grigo; Friedrich Fahnler, both of Krefeld; Christian Lindner, Cologne; Rudolf Binsack, Krefeld, all of Fed. Rep. of Germany

[73] Assignee: Bayer Aktiengesellschaft, Leverkusen, Fed. Rep. of Germany

[21] Appl. No.: 263,287

[22] Filed: May 13, 1981

[30] Foreign Application Priority Data

May 20, 1980 [DE] Fed. Rep. of Germany ....... 3019233

[51] Int. Cl.³ .............................................. C08L 77/00
[52] U.S. Cl. ....................................... 525/66; 525/183
[58] Field of Search ........................................... 525/66

[56] References Cited

U.S. PATENT DOCUMENTS

| | | | |
|---|---|---|---|
| 3,134,746 | 5/1964 | Grabowski | 525/184 |
| 3,267,175 | 8/1966 | Grabowski | 525/66 |
| 4,173,556 | 11/1979 | Coran et al. | 260/30.8 R |
| 4,221,879 | 9/1980 | Humme | 525/66 |

Primary Examiner—Paul Lieberman
Attorney, Agent, or Firm—Connolly and Hutz

[57] ABSTRACT

Moulding compositions comprising polyamides and (meth) acrylate grafted optionally substituted polybutadienes.

5 Claims, No Drawings

ELASTOMERIC THERMOPLASTIC MOULDING COMPOSITIONS

The invention relates to elastomeric moulding compositions produced from polyamides and acrylates-grafted polybutadienes having a substantially temperature-independent impact strength and good thermoplastic processability.

Graft polymers based on cross-linked polybutadiene rubbers can hardly be thermoplastically processed without decomposition if their graft monomer content is of less than 50%, by weight.

It has now surprisingly been found that additions of relatively small quantities of polyamides to acrylate-grafted polybutadienes composed of substantially cross-linked particles of defined sizes lead to good thermoplastic processability of the graft polymers. The elastomeric thermoplastic moulding compositions produced in this way have, in addition to the good thermoplastic processability thereof, an excellent impact strength which is virtually independent of temperature to −40° C.

The present invention therefore relates to elastomeric thermoplastic moulding compositions composed of:

(A) from 5 to 35%, preferably from 10 to 30%, by weight, of polyamides having a relative viscosity (as measured on a 1%, by weight, solution in m-cresol at 25° C.) of from 2.5 to 5.0, preferably from 2.8 to 4.5; and (B) from 95 to 65%, preferably from 90 to 70%, by weight of a graft product produced from:

(1) from 70 to 95%, by weight, preferably from 75 to 90%, weight, more preferably 80%, by weight, of a crosslinked polymer composed of at least 95%, by weight, of butadiene and/or substituted butadiene as graft substrate, the gel content of the graft substrate being >70%, preferably >80%, by weight, as measured in toluene, the degree of grafting G being ≧0.15, preferably ≧0.40, and the average particle diameter of the graft base being from 0.2 to 0.6 μm, preferably from 0.3 to 0.5 μm, in particle about 0.4 μm; and (2) from 5 to 30%, by weight, preferably from 10 to 25%, by weight, more preferably 20%, by weight, of an ester of methacrylic acid and/or acrylic acid with an alcohol containing from 1 to 8 carbon atoms, preferably from 1 to 4 carbon atoms, in particular methanol, as graft monomers;

the sum of (A) and (B), and (1) and (2) being always 100% by weight.

Suitable polyamides for the moulding compositions according to the present invention include: Polyamide-6, polyamide-6,6, mixtures and copolymers of these two components and copolymers of caprolactam. Polyamides the acid component of which consists completely or partially of terephthalic acid and/or isophthalic acid and/or suberic acid and/or sebacic acid and/or azelaic acid and/or cyclohexane dicarboxylic acid, and the diamine component of which consists completely or partially of m- and/or p-xylylene diamine and/or 2,2,4-trimethylhexamethylene diamine and/or xylylene diamine and/or 2,24-trimethyl-hexamethylene diamine and/or isophorone diamine may also be used.

In addition, polyamides which have been prepared completely or partially from lactams containing from 7 to 12 carbon atoms, optionally with concurrent use of one or more of the above-mentioned starting components, should also be mentioned.

Preferred polyamides include polyamide-6 and copolyamides based on polyamide-6 having a polyamide-6 content of more than 50%, by weight.

The relative viscosity of the polyamides used, measured as a 1% solution in m-cresol at 25° C., should be from 2.5 to 5.0, preferably from 2.8 to 4.5.

Diene rubbers based on polybutadiene and/or polyisoprene which may contain up to 5%, by weight, of styrene and/or esters of (meth)acrylic acid, such as methyl or ethyl(meth)acrylate, as comonomers are used as graft substrate for the preparation of the graft products. The gel content of the polymer used as graft substrate should be >70% by weight, preferably >80%, by weight (measured in toluene).

The preferred graft substrate is composed of polybutadiene.

The esters of methacrylic acid and/or acrylic acid with an alcohol containing from 1 to 8 carbon atoms are used as graft monomers. The methyl esters are preferred. Methyl methacrylate is particularly preferred.

The graft products according to the present invention may be prepared by known polymerisation processes (emulsion, solution, mass, suspension, precipitation polymerisation), and from combinations of these processes.

In order to prepare the graft products, the graft monomers are polymerised in the presence of the previously formed graft substrate. Some free homopolymer is also formed in addition to the graft copolymer itself. The term "graft products" includes the graft copolymers and the free polymers. The quantity of monomers grafted, the molecular weight thereof and the composition of the monomers grafted may be influenced within wide limits by varying the polymerisation conditions. These include, in particular, the type of polymerisation process, temperature, activator system, molecular weight regulators, stirring conditions and method of metering the monomer. According to the present invention, the degree of grafting should be G ≧0.15, preferably ≧0.40. The degree of grafting G denotes the quantitative ratio of grafted (meth)acrylate to the total quantity in the graft monomer.

Emulsion polymerisation is the preferred polymerisation process for the graft polymers according to the present invention.

Cross-linked butadiene polymers preferably obtained by emulsion polymerisation are preferred as graft substrate for the preparation of the graft products by emulsion polymerisation. Graft products having an "average particle diameter" $d_{50}$ of from 0.2 to 0.6 μm, preferably from 0.3 to 0.5 μm, in particular about 0.4 μm, are preferably used according to the present invention. (For determination cf. W. Scholtan and H. Lange, Kolloid Z. and Z. Polymere 250 (1972) 782–796 and G. Kämpf, H. Schuster, Angew. Makromolekulare Chemie 14 (1970), pages 111 to 129).

For the preparation of the moulding compositions according to the present invention, it is advantageous to use the above-mentioned graft monomers in specific quantities. According to the present invention, the graft monomer should preferably consist of from 5 to 30%, by weight, preferably from 10 to 25%, by weight, in particular 20%, by weight, of an ester of (meth)acrylic acid with an alcohol containing from 1 to 8 carbon atoms, preferably from 1 to 4 carbon atoms, in particlar methanol.

Instead of using only one graft substrate, it is also possible to use mixtures of various graft substrates for the preparation of the graft products. Moreover, mixtures of several graft products according to the present invention of differing structure may be mixed with the polyamides instead of only one graft product.

The preparation of the moulding compositions according to the present invention is not critical. It may therefore be carried out in the conventional mixing units, such as rollers, kneaders, single-screw and multiple-screw extruders. Double-screw extruders are particularly preferred.

The moulding compositions may be prepared on the above-mentioned mixing units by melting and homogenising the two components (A) and (B) together or by incorporating the graft product (B) into the melt of the polyamide (A).

The temperature during the preparation of the moulding composition should preferably lie at least 10° C. above the melting point of the polyamide (A) and below 310° C., preferably from 260° to 300° C.

Grafting may take place between the two components when mixing polyamide and graft product. The degree of grafting which denotes the ratio of graft product (B) grafted on to the polyamide to the total graft product (B) may be determined by preparatory fractionating using fractionating solvents (see R. Kuhn, Makromol, Chem. 177, (1976), 1525 et seq.).

The elastomeric moulding compositions according to the present invention are distinguished by an impact strength which is substantially independent of temperature to −40° C., by a surprisingly high compatibility between the two blending components and by surprisingly good thermoplastic processability which is expressed, on the one hand, in relatively easy processability of the melt and, on the other hand, by an excellent surface of extruded and injection moulded articles.

The moulding compositions according to the present invention may contain conventional additives, such as lubricants and mould release agents, nucleation agents, stabilisers and flame-proofing agents, as well as dyes. The additives are preferably added in pure form or as concentrates during the compounding operation.

The elastomeric moulding compositions according to the present invention may be used wherever elastic properties in addition to high impact strength at low temperatures are required, particularly for winter sports articles and soles of shoes.

Relatively flexible, elastomeric moulded articles which are particularly suitable as sealing materials for example, may also be produced from the composition according to the present invention.

EXAMPLES

Preparation of the graft product

A solution of 80 parts, by weight, of deionised water, 1.5 parts, by weight, of sodium salt of disproportionated abietic acid and 0.3 parts, by weight, of potassium peroxide sulphate are placed in a pressure-resistant stirrer vessel. After purging with nitrogen and adjusting the internal temperature to 55° C., 0.36 parts, by weight, of dodecylmercaptan and X butadiene are added and polymerised. As the reaction rate decreases with the progression of polymerisation, the temperature is slowly raised to 68° C.

Upon completion of polymerisation, small quantities of the unreacted butadiene are removed by stirring the latex obtained under reduced pressure.

175 parts by weight of deionised water and 0.3 parts, by weight, of potassium peroxide sulphate are added.

After purging with nitrogen and heating to 65° C., 2 parts, by weight, of emulsifier (Na-salt of isoproportionated abietic acid or alkyl sulphonates) dissolved in γ parts, by weight, of methyl methacrylate are added.

The feed time is approximately four hours. In order to complete the reaction, the mixture is stirred for a further two hours at 65° C. once the feed has ended.

The thus obtained graft product latex is coagulated with 2% MgSO$_4$/acetic acid solution (mixing ratio 1:1 parts, by weight) after addition of 1 part, by weight, of phenolic antioxidant (2,6-di-t-butyl-p-cresol), the coagulate separated, washed free from salt and dried at 70° C. under vacuum.

The composition of the graft product is indicated in Table 1.

TABLE 1

| | Composition of the graft products | | |
|---|---|---|---|
| No. | Graft substrate Parts, by weight butadiene X | Grafts monomer Parts by weight methyl meth acrylate Y | Average particle diameter/μm |
| A | 90 | 10 | 0.4 |
| B | 80 | 20 | 0.4 |
| C | 70 | 30 | 0.4 |
| D | 80 | 20 Methylacrylate | 0.4 |

Preparation of elastomeric moulding compositions from graft product and polyamide (Examples 1 to 6)

The graft products A to D are incorporated into polyamide in a conventional commercial, continuously operating double-screw extruder ZSK 32, by Messrs. Werner and Pfleiderer, in which the polyamide is firstly melted.

The graft product was metered into the polyamide melt by a second filling nozzle. A nitrogen atmosphere is preferable. The graft product is melted and homogeneously distributed in the polyamide. It may be advantageous to degasify the melt before it issues from the nozzle. The cylinder temperatures are adjusted so as to ensure a melt temperature of from 280° to 300° C. The strand of melt of the polyamide and graft product mixture is cooled in water, granulated and dried. Standard small bars (according to DIN No. 53 453) are injected from the granulate on a conventional injection moulding machine at 260° C.

The notched impact strength was tested at room temperature and at −20° C. and −40° C. (according to DIN 53 453) and the flexural strength was determined. The composition and the properties of the moulding compositions are shown in Table 2.

TABLE 2

| | Composition and properties of the elastomeric moulding compositions | | | | | | | | |
|---|---|---|---|---|---|---|---|---|---|
| | Graft Product | | Polyamide | | | Notched impact strength (kg/m$^2$) | | | Flexural strength |
| Example | Type | %, by weight | Type | η rel$^{(1)}$ | %, by weight | +20° C. | −20° C. | −40° C. | MPa |
| 1 | A | 80 | PA-6 | 2.91 | 20 | 22.2 | 20.9 | 20.4 | 12.1 |
| 2 | B | 80 | " | " | 20 | 26.2 | 23.4 | 23.9 | 13.3 |

TABLE 2-continued

| | Composition and properties of the elastomeric moulding compositions | | | | | | | |
|---|---|---|---|---|---|---|---|---|
| | Graft Product | | Polyamide | | | Notched impact strength (kg/m²) | | Flexural strength |
| Example | Type | %, by weight | Type | η rel[1] | %, by weight | +20° C. | −20° C. | −40° C. | MPa |
| 3 | C | 80 | " | " | 20 | 24.2 | 21.5 | 22.7 | 14.5 |
| 4 | B | 70 | " | " | 30 | 31.6 | 22.7 | 18.3 | 18.0 |
| 5 | B | 90 | " | " | 10 | 20.8 | 23.0 | 24.8 | 9.0 |
| 6 | D | 80 | " | " | 20 | 22.4 | 23.1 | 22.5 | 23.0 |

[1]relative viscosity, measured on a 1% solution in m-cresol at 25° C. in a Ubbelohde viscosimeter.

We claim:

1. Elastomeric thermoplastic moulding compositions composed of:
   (A) from 5 to 35%, by weight, of a polyamide; and
   (B) from 95 to 65%, by weight, of a graft product produced from:
      (1) from 70 to 95% by weight of a crosslinked polymer consisting of at least 95%, by weight, of optionally substituted butadiene as graft substrate; and
      (2) from 5 to 30%, by weight of an ester of methacrylic acid and/or acrylic acid and an alcohol containing from 1 to 8 carbon atoms as graft monomer, the gel content of the graft base being >70%, as measured in toluene, the degree of grafting G being ≧0.15 and the average particle diameter of the graft base being from 0.2 to 0.6 μm and the sum of (A) and (B), and (1) and (2) always being 100% by weight.

2. Moulding compositions as claimed in claim 1, containing from 10 to 30% by weight of component (A), and from 20 to 70% by weight of component (B).

3. Moulding compositions as claimed in claim 1 wherein component (B) consists of from 75 to 90% by weight of component (1) and from 25 to 10% by weight of component (2).

4. Moulding compositions as claimed in claim 1, wherein component (1) is polybutadiene and component (2) methylmethacrylate.

5. Moulding compositions as claimed in claim 1, wherein as polyamide, polyamide-6 or copolyamides having a polyamide-6 content of more than 50% by weight are used.

* * * * *